UNITED STATES PATENT OFFICE.

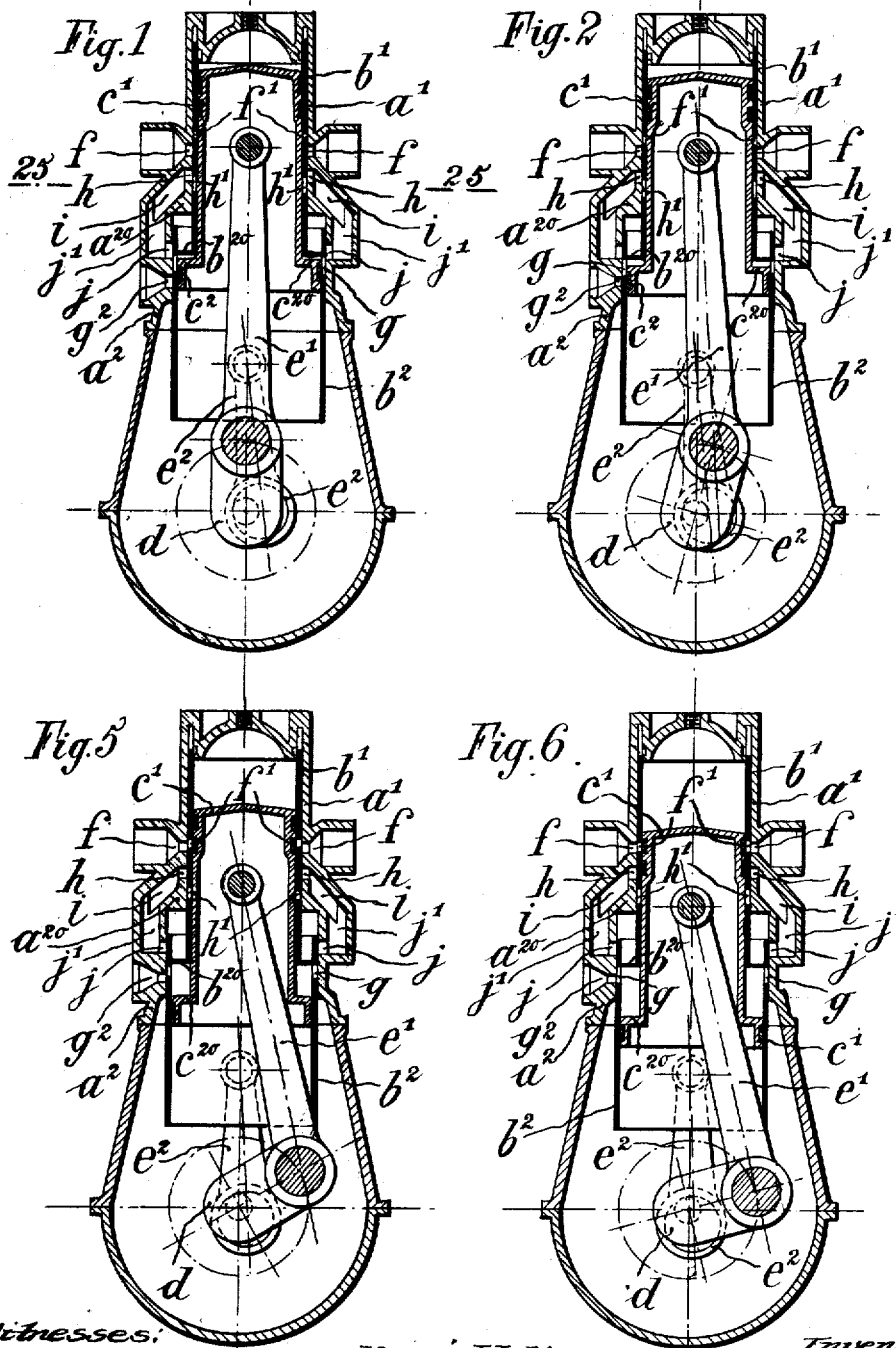

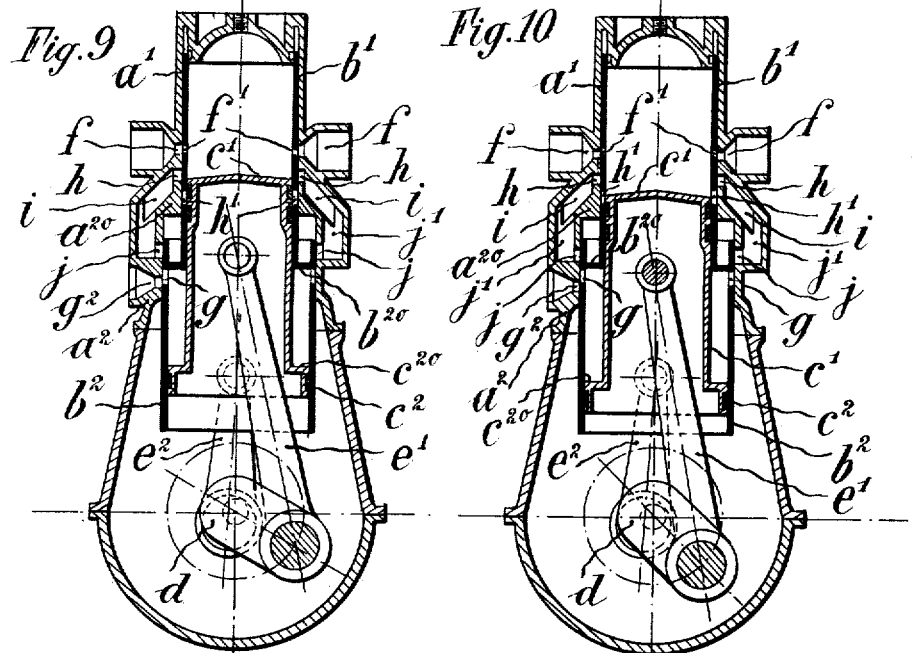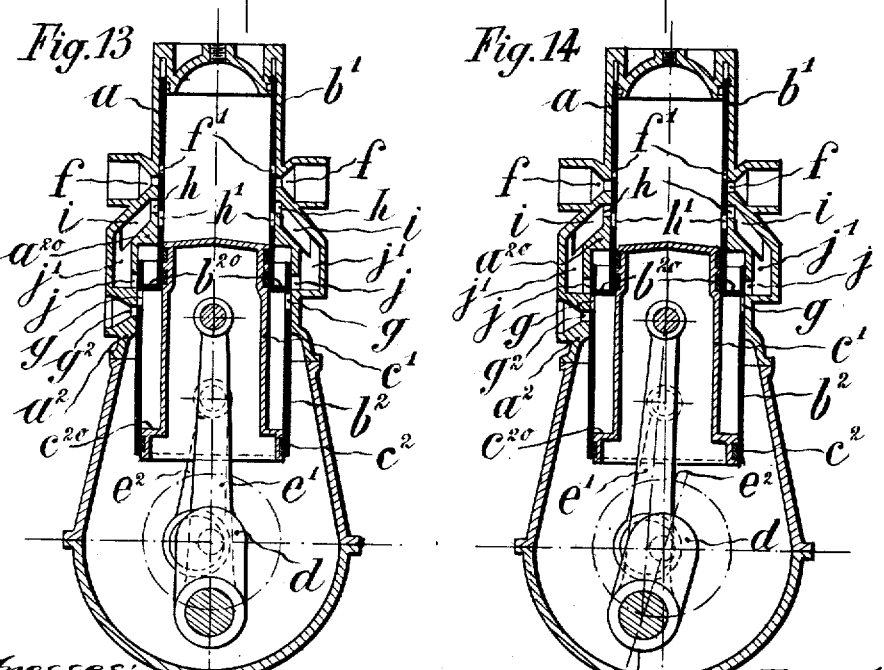

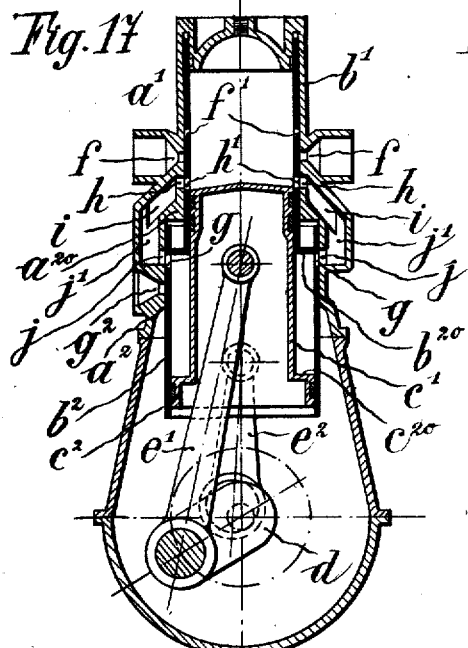
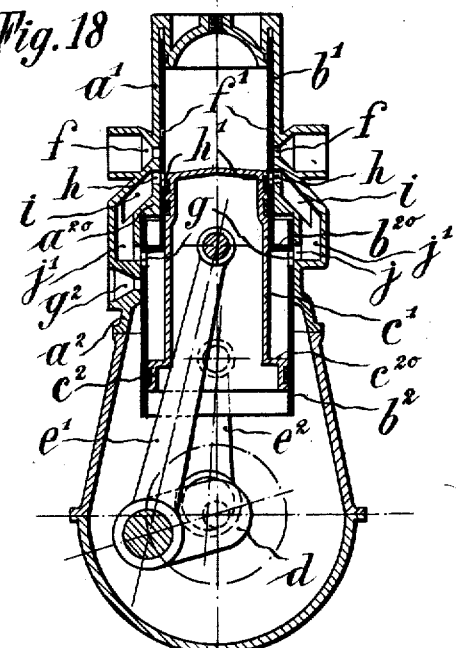
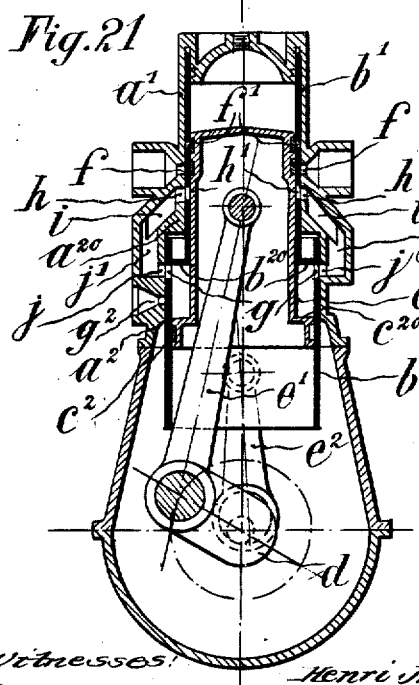
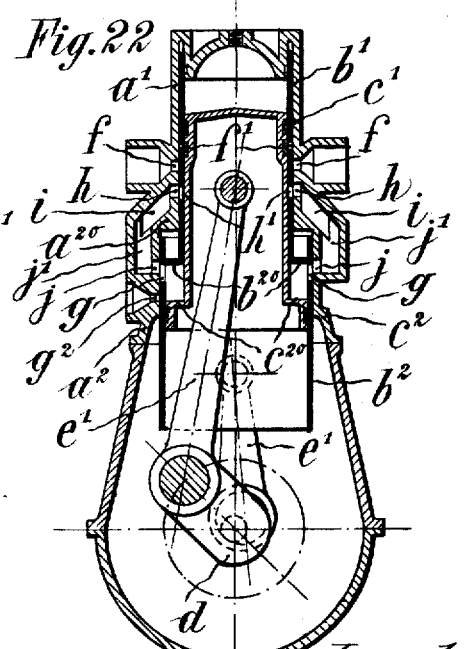

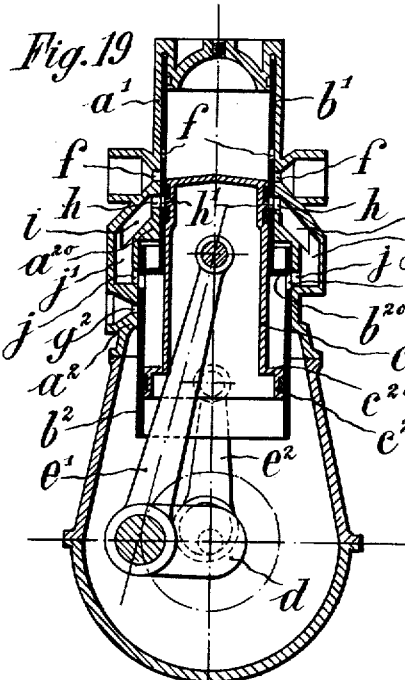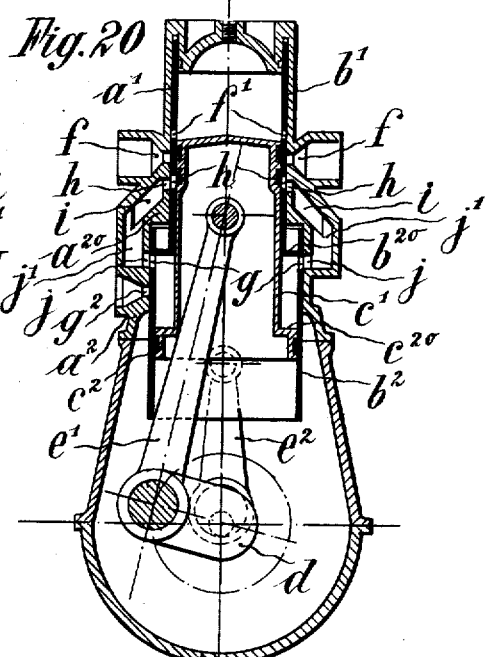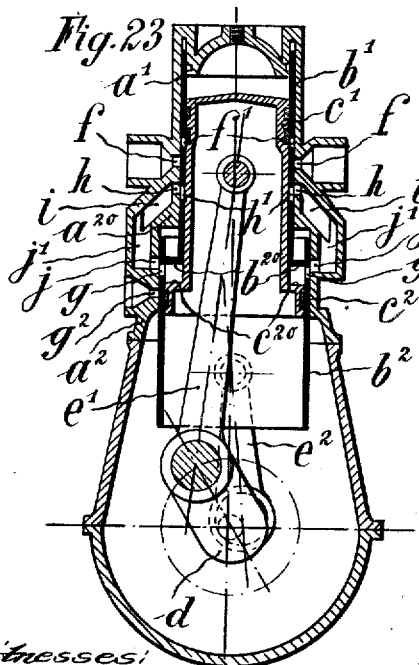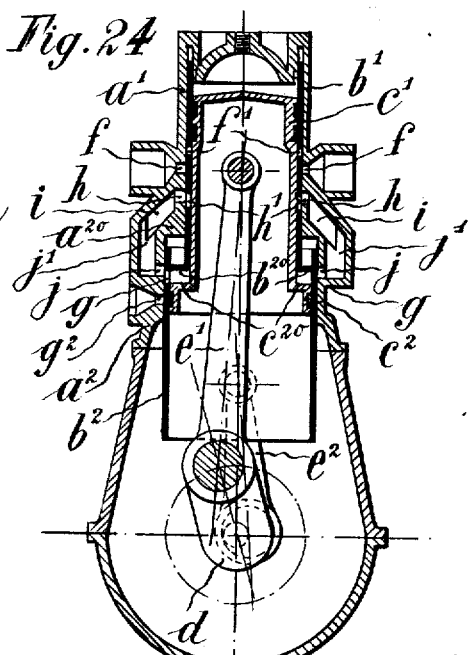

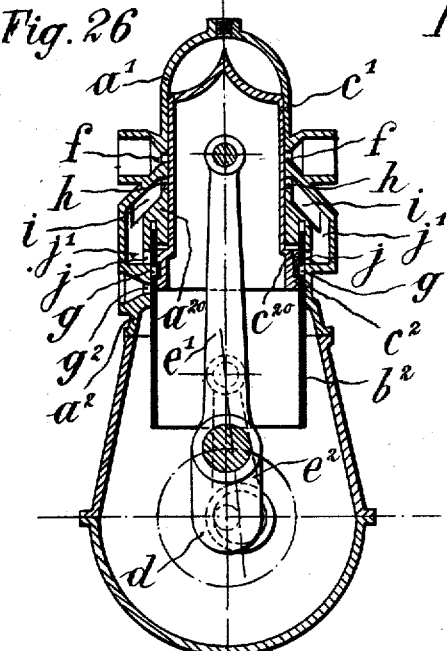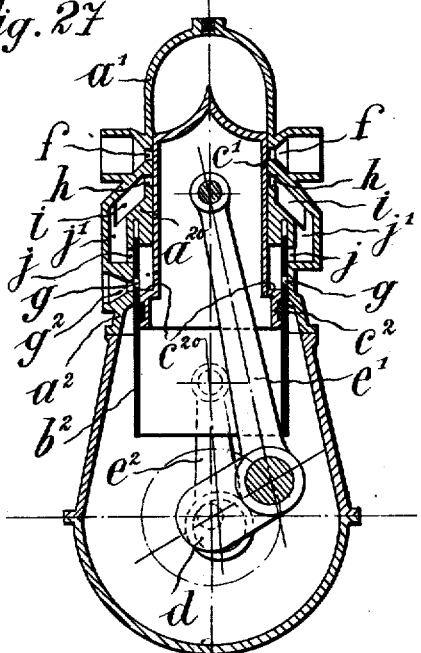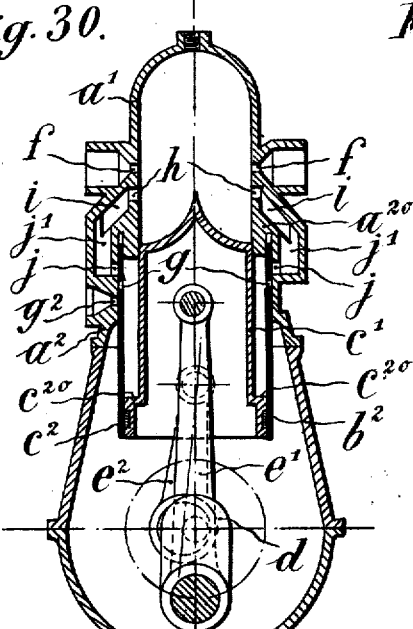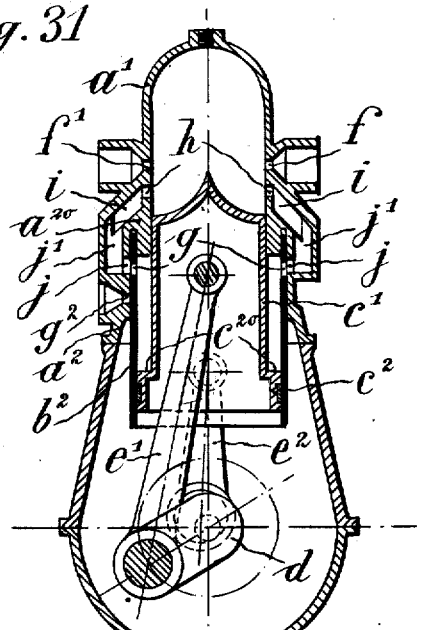

HENRI JOSEPH LÉON MARIE DE LA CHEVARDIÈRE DE LA GRANDVILLE AND ANDRÉ GUÉRET, OF PARIS, FRANCE.

TWO-STROKE INTERNAL-COMBUSTION ENGINE.

1,301,661.     Specification of Letters Patent.     Patented Apr. 22, 1919.

Application filed October 22, 1917. Serial No. 197,960.

*To all whom it may concern:*

Be it known that we, HENRI JOSEPH LÉON MARIE DE LA CHEVARDIÈRE DE LA GRANDVILLE and ANDRÉ GUÉRET, both citizens of the French Republic, residing at Paris, France, have invented certain new and useful Improvements in Two-Stroke Internal-Combustion Engines, of which the following is a specification.

This invention relates to two-stroke internal combustion engines having a charging pump, and relates more particularly to multi-cylinder engines of this kind having sleeve valves.

This invention has for its object to obtain engines of this kind, in a more economical manner than hitherto and to obtain engines of a greater efficiency than hitherto.

This invention consists mainly in connecting the exhaust port of each charging pump with the inlet ports of all the cylinders of the engine and in providing means for insuring that, while the exhaust port of a charging pump remains uncovered, the inlet port of at least one of the cylinders remains also uncovered; in consequence of which the fresh gases sucked up by a charging pump are transferred in the various cylinders without having been previously subjected to compression.

It consists further in establishing the engines of that kind in such a manner that the exhaust port of each cylinder be entirely uncovered by the sleeve valve when the piston begins to uncover the said port; the said sleeve valve covering again the said port preferably before it is covered again by the piston.

It consists further in establishing the engines of that kind in such a manner that the inlet port of each cylinder be only uncovered by the sleeve valve when it has been uncovered by the piston, and be covered again by the piston before it be covered again by the sleeve valve.

It consists also, in using, in engines of that kind, in which the charging pump for each cylinder is constituted by an annular chamber surrounding concentrically the cylinder, the same sleeve valve for controlling the pump and cylinder ports.

It consists also in other features which will be more clearly set forth hereinafter and pointed out in the claims.

And it will be clearly understood from the following description as well as from the accompanying drawing given merely by way of example.

Figures 1–24 of the said drawing show diagrammatically in longitudinal section through one of its cylinders at right angle to its crank, and in twenty four successive positions of its movable parts, corresponding to as many angular movements of 15° each of the said crank, a four cylinder two-stroke explosion engine with charging pump designed according to a first method of carrying out this invention.

Figs. 26–33 show diagrammatically in longitudinal section through one of its cylinders, at right angle to its crank, and in eight successive positions of its movable parts, a four cylinder two-stroke explosion engine with charging pump designed according to a second method of carrying out this invention.

Figure 3:
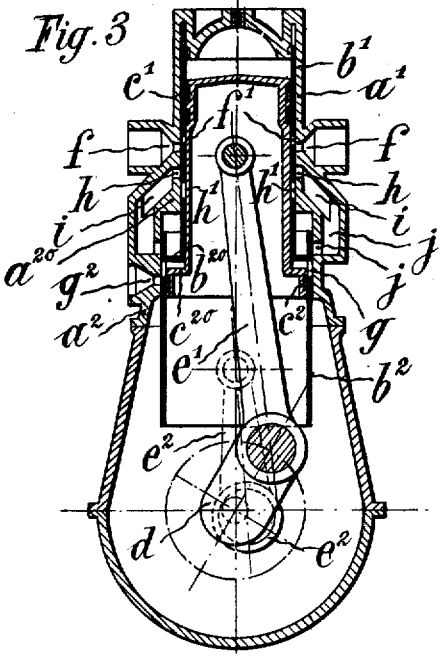
Figure 4:
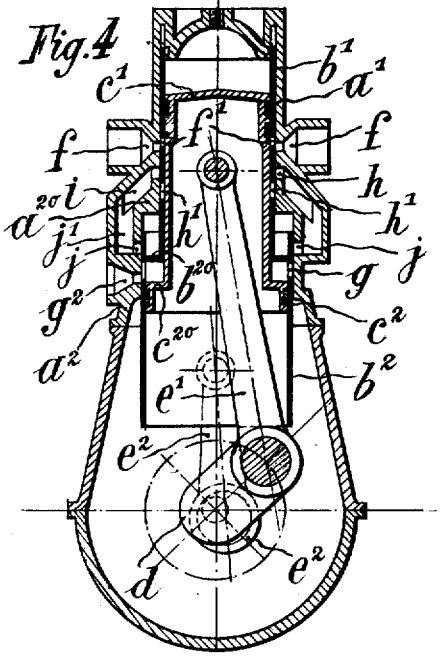

When it is desired to construct a four cylinder two-stroke explosion engine with charging pumps and having sleeve valves, the proceeding is as follows:

The improved engine comprises essential elements and features of improvement as follows:

(1) Four differential cylinders, the small portion $a^1$ of each one of them constituting the working cylinder and being connected to the portion $a^2$ of larger diameter which constitutes the outer wall of the annular body of the charging pump by a connecting surface $a^{20}$ which forms the cover of the said body;

(2) A sleeve for each cylinder, which sleeve comprises a first part $b^1$, the external diameter of which is equal to the internal diameter of the portion $a^1$ of the cylinder for forming a sleeve in the said portion $a^1$, a second part $b^2$, the external diameter of which is equal to the internal diameter of the portion $a^2$ of the cylinder for forming a sleeve in the said portion $a^2$, and a wall $b^{20}$ connecting the said first and second part, a recess being if desired formed in the said wall for increasing the clearance of the pump;

(3) A piston for each cylinder, the said piston having a part $c^1$ the external diameter of which is equal to the internal diameter of the part $b^1$ of the sleeve, a part $c^2$ the external diameter of which is equal to the internal diameter of the part $b^2$ of the said sleeve and an annular part $c^{20}$ connecting the said parts $c^1$ and $c^2$;

(4) A crank shaft $d$, four connecting-rods $e^1$ which connect the said crank-shaft to the said pistons; and four connecting-rods $e^2$ which connect the said crank-shaft to the said sleeves; the crank pins of the connecting-rods $e^2$ being shifted a suitable angle with respect to the crank pins of the connecting-rods $e^1$, in order that, for instance, the sleeves have an advance of approximately 90° (83° on the engine shown in the drawings) with respect to their corresponding pistons.

In accordance with the invention, in the wall of the portion $a^1$ of the cylinders, near its middle or in the part corresponding to the half last part of the working stroke of the piston are provided exhaust ports $f$; and in the part $b^1$ of the sleeve are provided ports $f^1$ in such manner that they uncover the ports $f$ when the sleeve reaches the end of its downward stroke, and begin themselves to be uncovered by the piston at the moment when they have entirely uncovered the said ports $f$.

In the part $b^2$ of the sleeve, near the wall $b^{20}$ are provided ports $g$; and in the wall of the portion $a^2$ of the cylinders are provided inlet ports $g^2$ for the charging pump, the said ports being connected to a suitable feeding arrangement such, for instance, as a carbureter; the said ports $g^2$ are in such a position that they are uncovered by the sleeve when the said sleeve reaches the end of its downward stroke.

In the wall of the portion $a^1$ of the cylinders, under the ports $f$, are provided inlet ports $h$ the height of which is lower than or at least equal to the distance existing between their upper edge and the active face of the piston $c^1$ when the said piston reaches its lower dead center; and in the portion $b^1$ of the sleeve, are provided ports $h^1$ in such a manner that the said ports begin to uncover the said ports $h$ just before the exhaust of the corresponding cylinder is entirely closed.

Around the cylinders is provided a kind of conduit $i$ in which the inlet ports of the cylinders open and in the wall of the portion $a^2$ of the cylinders are provided in such a manner exhaust ports $j$ for the pumps that the said ports are uncovered by the ports $g$ of the sleeve when the said sleeve reaches the end of its ascending stroke; the said ports $j$ are connected by means of conduits $j^1$ to the conduct $i$.

The engine works as follows:

When the piston has reached the end of its ascending stroke (Fig. 1) the fresh gases being compressed in the explosion chamber of the cylinder, and the inlet and exhaust ports of the said cylinder being covered the ignition takes place and the piston begins its downward stroke. At this time the sleeve will have reached approximatively the first half of its downward stroke, and it covers the exhaust port $j$ of the pump, while the inlet port $g^2$ of the pump remains open.

The piston is forced downward and first the burnt gases expand in the explosion chamber as they cannot escape, the exhaust ports $f$ remaining covered (Figs. 2 to 6); but the sleeve continues its downward stroke, and begins to produce a light vacuum in the pump between the walls $b^{20}$ and $c^{20}$ which are brought slightly away from each other, and as the port $g$ of the sleeve uncovers the inlet port $g^2$ of the pump fresh gases are sucked up in the pump.

The sleeve reaches the end of its downward stroke, its ports $f^1$ uncover the exhaust ports $f$ of the cylinder, but as the said ports $f$ are still covered by the piston $c^1$, the burnt gases cannot escape.

Figure 7:
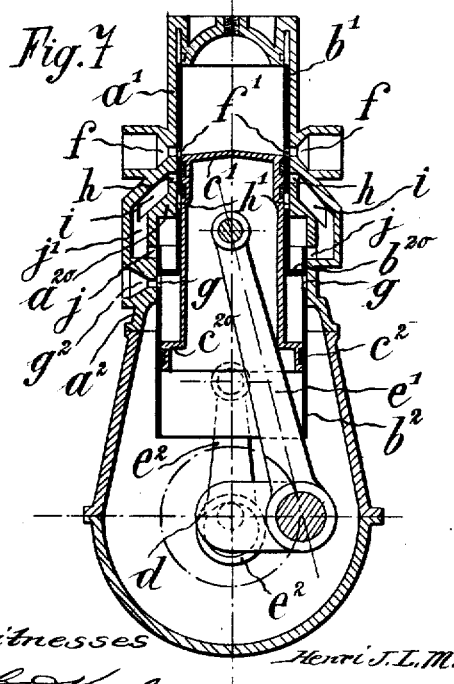
Figure 8:
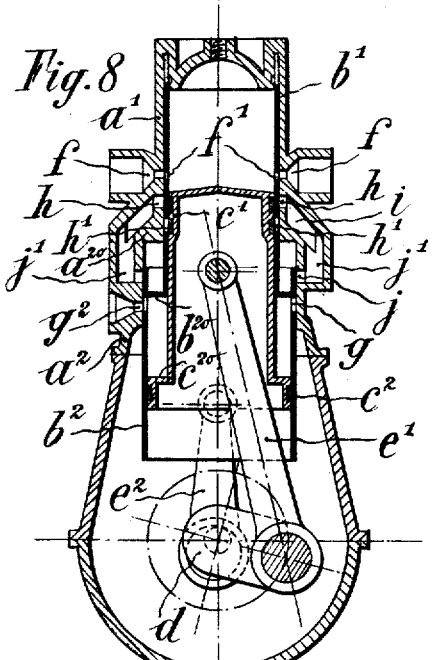
Figure 11:
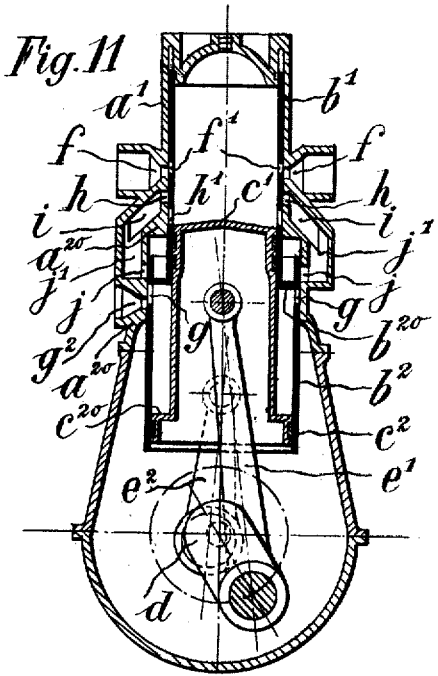
Figure 12:
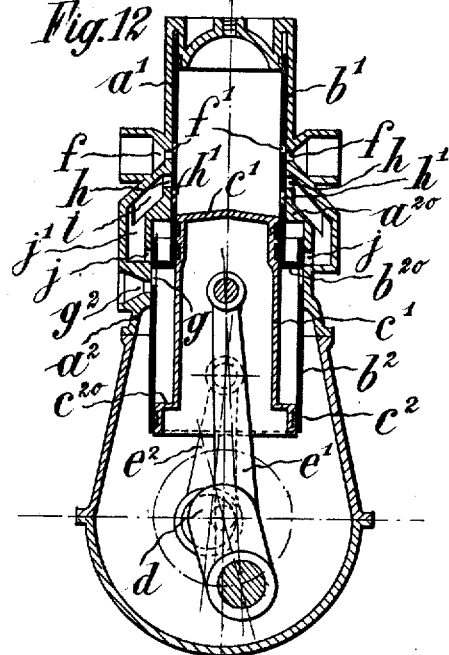
Figure 15:
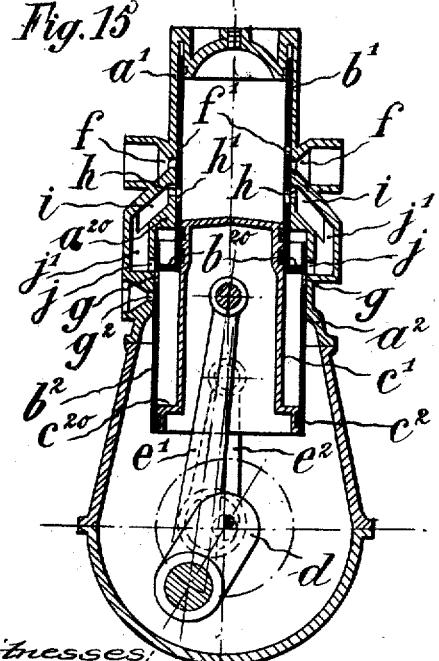
Figure 16:
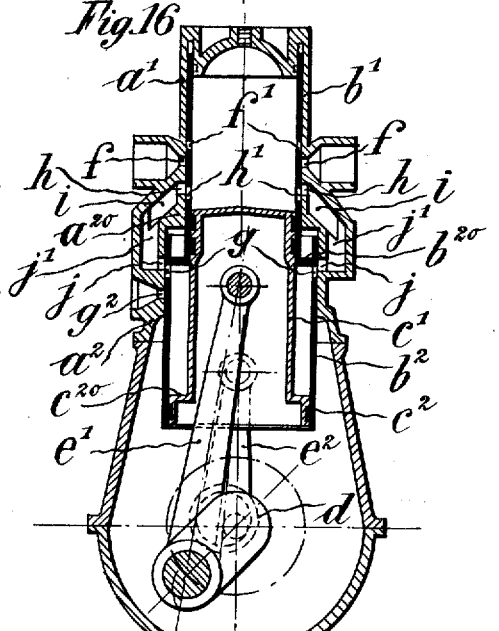
Figure 25:
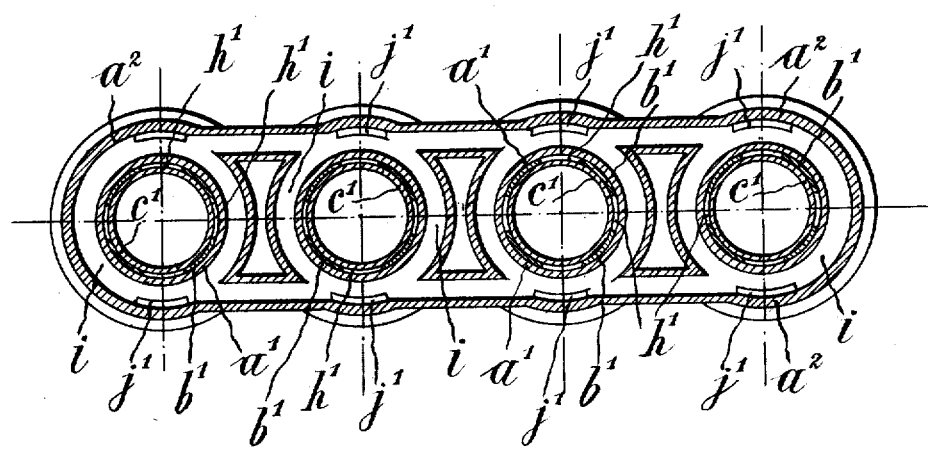
Fig. 25 shows diagrammatically in horizontal section, on line 25—25 Fig. 1, the same engine.
Figure 28:
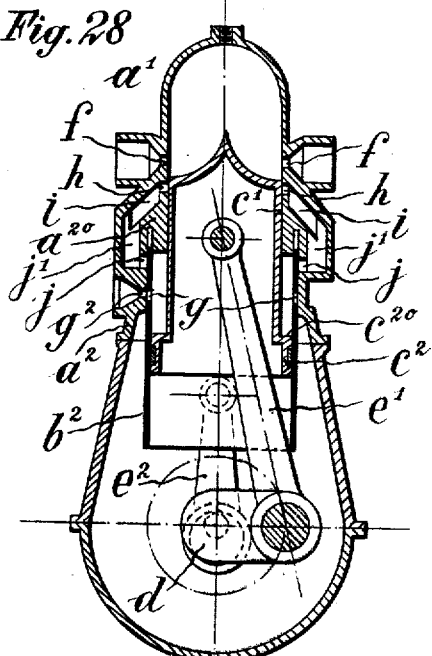
Figure 29:
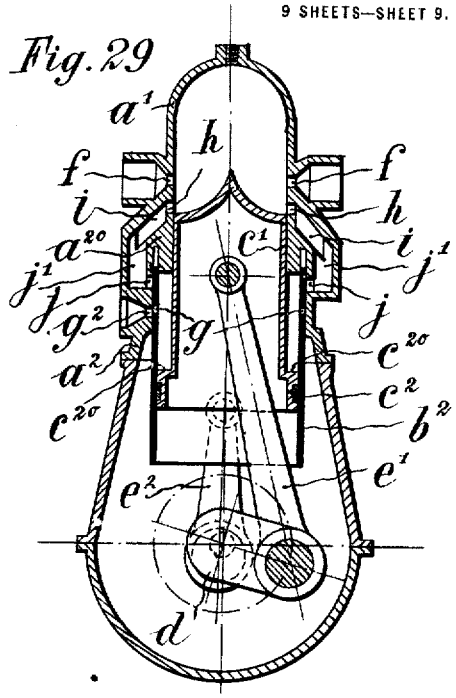
Figure 32:
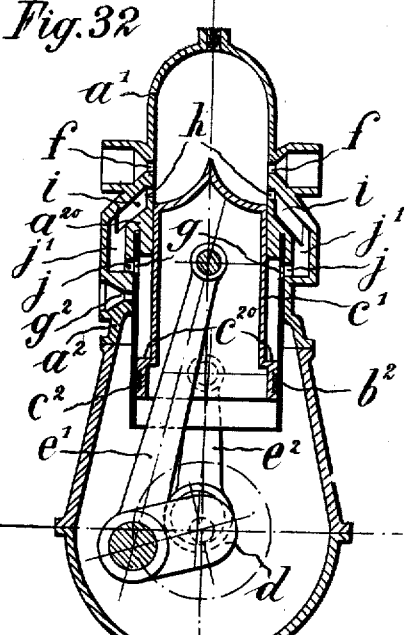
Figure 33:
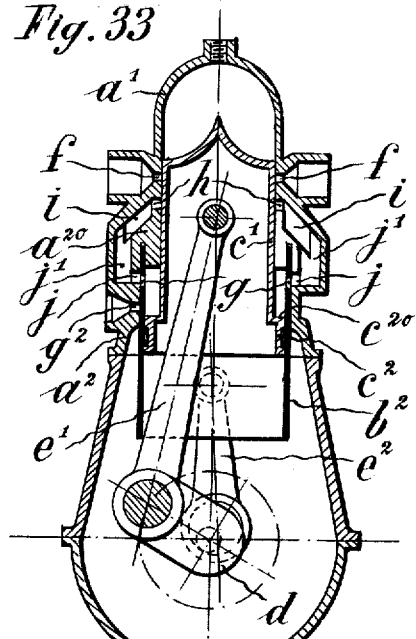

But the piston $c^1$ continues its downward stroke and begins to uncover the exhaust ports $f$ (Fig. 7), and the uncovering of the said ports is produced very rapidly because they are entirely uncovered by the sleeve's ports $f^1$ and because the piston $c^1$ being approximately in the middle part of its stroke is moved with the greatest speed. The sleeve has now reached the end of its downward stroke (Figs. 7 and 8) and as the speed of the piston is now greater than that one of the sleeve, the internal capacity of the pump increases, and the fresh gases are sucked up in the pump.

The piston $c^1$ continuing its downward stroke, the sleeve begins its rise (Figs. 9, 10, 11 and 12); the burnt gases escape and the sleeve rising begins to cover the exhaust ports $f$; the fresh gases are still sucked up in the pump as its capacity increases in consequence of the inverse movements of the sleeve and of the piston.

The piston reaches then the end of its downward stroke (Fig. 13); now the port $h^1$ of the sleeve begins to uncover the port $h$ of the cylinder and the fresh gases forced by the various charging pumps into the conduit $i$ enter the cylinder, expelling the remaining burnt gases through the exhaust ports $f$ which are not yet entirely covered. But the sleeve in its rise covers the inlet ports $g^2$ of the pump and uncovers immediately the exhaust ports $j$ of the pump (Fig. 14) and the fresh gases are transferred without compression from the pump, through the said ports $j$, into the conduit $i$.

At this time the speed of the piston is faster than that of the sleeve, and the capacity of the pump decreases, insuring the transfer of the fresh gases into the conduit $i$.

The piston and the sleeve continue their rise (Figs. 15, 16, 17 and 18) and the pump transfers into the conduit $i$ fresh gases which pass in the cylinder through the inlet port $h$.

The piston in its rise begins to cover (Fig. 18) the inlet port $h$ and compresses the fresh gases in the explosion chamber.

The compression is continued till the piston reaches the end of its rise (Figs. 24 and 1).

But the sleeve has before reached the end of its rise and begins its downward stroke (Fig. 21), and as it is moved in an opposite direction with respect to the piston its wall $b^{20}$ is brought nearer the wall $c^{20}$ of the piston, the capacity of the pump decreases, and as the port $j$ remains uncovered, the fresh gases are forced from the pump into the conduit $i$ and pass from the said conduit into the other cylinders the inlet ports of which are opened.

When the piston has reached the end of its rise, the capacity of the pump has been reduced to its minimum and the sleeve continuing its downward stroke covers the exhaust port $j$ of the pump.

The operation begins then again as before.

In such an engine, if the height of the ports has been suitably determined for having always, while the exhaust ports of a pump are uncovered, the inlet ports of a cylinder uncovered, the fresh gases cannot be compressed in the pump or in the conduit $i$ and the said gases are transferred in the cylinders without having previously been uselessly compressed.

The same engine could be established in a more economical manner, but would be of less efficiency by omitting the portion $b^1$ of the sleeve and in controlling only by the piston $c^1$ the inlet ports $h$ and exhaust ports $f$, as shown in Figs. 26 to 33.

The operation of the said engine is the same as that one of the engine shown on Figs. 1 to 24, but the exhaust ports $f$ remain open a longer time, as they remain open during the admission and are covered only when the inlet ports have been covered.

However, in such an engine, the ports $g$ and $j$ are made in such a manner that the pump can only begin to force fresh gases into the conduit $i$, when the inlet port of a cylinder being uncovered by the corresponding piston, the said piston has approximatively reached the end of its downward stroke; in consequence of which the admission begins only when the greatest part of the burnt gases has escaped through the exhaust ports $f$.

Furthermore the active upper face of the piston is made approximatively conical for facilitating the burnt gases to be expelled by the fresh gases.

Obviously the invention is by no means limited to those methods of carrying it out which have been described, but comprises on the contrary any modification within the scope of the claims.

What we claim as out invention and desire to secure by Letters Patent is:

1. A multi-cylinder two-stroke internal combustion engine having a charging pump for each cylinder, each cylinder having a piston therein and also provided with a surrounding conduit, means for connecting the exhaust port of each pump to the said conduit and to the inlet ports of all cylinders, and means for controlling the covering and uncovering of the exhaust ports of the pumps and the inlet ports of the cylinders in such a manner that as long as the exhaust port of a charging pump remains uncovered, the inlet port of at least one of the cylinders remains also uncovered.

2. A multi-cylinder two-stroke internal combustion engine having a charging pump for each cylinder and a main conduit surrounding each cylinder and into which conduits open the exhaust ports of all the pumps and the inlet ports of all the cylinders, and a sleeve valve for controlling the covering and uncovering of the exhaust ports of the pumps and the inlet ports of the cylinders in such a manner that as long as the exhaust port of a charging pump remains uncovered, the inlet port of at least one of the cylinders remains also uncovered.

3. A multi-cylinder two-stroke internal combustion engine having a charging pump for each cylinder and a main conduit surrounding each cylinder and into which conduits open the exhaust ports of all the pumps and the inlet ports of all the cylinders; each cylinder being a differential cylinder, the larger portion of which forms together with another portion of the engine, an annular chamber constituting the body of the pump; a differential piston in each cylinder the part of smaller diameter of which constitutes the piston of the engine and the part of greater diameter constitutes the piston of the pump; exhaust and inlet ports being provided in the wall of the cylinders for the explosion chambers and for the pump; a sleeve valve connected in advance with respect to the corresponding piston by means of a connecting rod to the crank shaft of the engine, controlling with the part of greater diameter of the piston the ports of the pump, the ports of the explosion chamber being controlled by the piston; the advance of the sleeve and the position of the ports being such that, as long as the exhaust port of a charging pump remains uncovered, the inlet port of at least one of the cylinders remains also uncovered.

4. A multi-cylinder two-stroke internal combustion engine having a charging pump for each cylinder and a main conduit surrounding each cylinder and into which conduits open the exhaust ports of all the pumps and the inlet ports of all the cylinders; each cylinder being a differential cylinder; the larger portion of which forms together with another portion of the engine an annular chamber constituting the body of the pump; a differential valve sleeve mounted in each differential cylinder and a differential piston mounted in the differential valve sleeve; connecting rods connecting in such a manner to the valve sleeves and the pistons that the valve sleeves are in advance of the pistons; inlet and exhaust ports provided in the walls of the differential cylinders for the pumps and for the explosion chambers; the said ports being controlled by the sleeve valves and by the pistons; the advance of the sleeves and the position of the ports being such that, as long as the exhaust port of a charging pump remains uncovered, the inlet port of at least one of the cylinders remains also uncovered.

5. A multi-cylinder two-stroke internal combustion engine having a charging pump for each cylinder and a main conduit surrounding each cylinder and into which conduits open the exhaust ports of all the pumps and the inlet ports of all the cylinders, each cylinder being a differential cylinder; a differential valve sleeve mounted in each cylinder and connected by connecting rods to the crank-shaft of the engine; a differential piston mounted in each cylinder and connected by connecting rods to the crank-shaft of the engine in such a manner that the valve sleeve be in advance with respect to the corresponding piston; inlet and exhaust ports provided in the walls of the differential cylinders for the pumps and for the explosion chambers, and also in the sleeve valves in different positions, the said ports being controlled by the sleeve valves and by the pistons in such a manner that the exhaust port of each explosion chamber is entirely uncovered by the corresponding sleeve valve when the corresponding piston begins to uncover the said port and preferably be covered again by the corresponding sleeve valve before it is covered again by the piston; the advance of the sleeve and the position of the ports being such that, as long as the exhaust port of a charging pump remains uncovered, the inlet port of at least one of the cylinders remains also uncovered.

In testimony whereof we have hereunto set our hands in presence of two subscribing witnesses.

HENRI JOSEPH LÉON MARIE DE LA
    CHEVARDIÈRE DE LA GRANDVILLE.
ANDRÉ GUÉRET.

Witnesses:
  CHAS. P. PRESSLY,
  PAUL PLUM.

Copies of this patent may be obtained for five cents each, by addressing the "Commissioner of Patents, Washington, D. C."